(12) United States Patent
Zawacki et al.

(10) Patent No.: US 9,552,093 B2
(45) Date of Patent: Jan. 24, 2017

(54) SELECTING A SENSOR FOR USER INPUT (75) Inventors: Jennifer Greenwood Zawacki, Hillsborough, NC (US); Justin Tyler Dubs, Durham, NC (US); Philip John Jakes, Durham, NC (US); Sean Michael Ulrich, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 818 days.

(21) Appl. No.: 13/189,304

(22) Filed: Jul. 22, 2011

(65) Prior Publication Data

US 2013/0021290 A1 Jan. 24, 2013

(51) Int. Cl.
*G06F 3/045* (2006.01)
*G06F 3/041* (2006.01)

(52) U.S. Cl.
CPC .................... *G06F 3/0416* (2013.01)

(58) Field of Classification Search
CPC ...... G06F 3/01; G06F 3/03547; G06F 2/0416; G06F 3/0488; G06T 2200/24; G06T 7/0042; H04M 2250/12; H04M 2250/22
USPC ......... 345/33, 40, 42, 90, 156–184; 178/18.01–19.04
See application file for complete search history.

(56) References Cited

U.S. PATENT DOCUMENTS

| 8,432,368 | B2 * | 4/2013 | Momeyer ............. G06F 1/1684 345/156 |
| 8,581,869 | B2 * | 11/2013 | Yamamoto et al. .......... 345/173 |
| 2002/0021278 | A1 * | 2/2002 | Hinckley ............. G06F 1/1626 345/156 |
| 2009/0179869 | A1 * | 7/2009 | Slotznick ....................... 345/173 |
| 2010/0164745 | A1 * | 7/2010 | Migos et al. ............. 340/825.69 |
| 2012/0293456 | A1 * | 11/2012 | Ikeda et al. .................... 345/174 |
| 2013/0069883 | A1 * | 3/2013 | Oga .............................. 345/172 |

FOREIGN PATENT DOCUMENTS

| JP | 2003-330611 | 11/2003 |
| JP | 2006-157434 | 6/2006 |
| JP | 2009294928 A * | 12/2009 .................... 345/173 |

* cited by examiner

*Primary Examiner* — Michael Faragalla
*Assistant Examiner* — Gerald Oliver
(74) *Attorney, Agent, or Firm* — Kunzler Law Group (57) ABSTRACT An apparatus and method are presented for selecting a surface for user input. The apparatus includes an information handling device having at least two surfaces and at least two sensors, as least one of the sensors being associated with one or more of the surfaces, a determination module, and a selection module. The determination module determines a current surface that is likely facing a user. The selection module selects one or more sensors associated with the current surface for user input.

22 Claims, 4 Drawing Sheets

ND A SENSOR FOR USER INPUT

FIELD

The subject matter disclosed herein relates to sensors and more particularly relates to selecting a sensor for user input.

BACKGROUND

Description of the Related Art

Certain devices, such as dual-touchscreen handheld computing devices, include multiple sides that provide an input sensor. A user may often interact with such devices by way of input through either side.

However, a user may inadvertently enter extraneous input into a sensor that the user does not mean to interact with. For example, a user may, when interacting with a two-sided handheld device, interact with a sensor on one side while resting a hand on the other side, providing unwanted interactions.

BRIEF SUMMARY

Based on the foregoing discussion, the inventors have recognized a need for an apparatus and method for selecting a sensor for user input. Beneficially, such an apparatus and method may select a sensor for user input based on a determination of which surface of an information handling device is likely facing a user.

The embodiments of the present disclosure have been developed in response to the present state of the art, and in particular, in response to the problems and needs in the art that have not yet been fully solved by currently available devices having multiple sensors and multiple surfaces. Accordingly, the embodiments have been developed to provide an apparatus and method for selecting a sensor for user input that overcome many or all of the above-discussed shortcomings in the art.

An apparatus is provided with an information handling device having at least two surfaces and at least two sensors and a plurality of modules configured to functionally execute the steps of determining a current surface that is likely facing a user and selecting the current surface for user input. At least one of the sensors may be associated with one or more of the surfaces. These modules in the described embodiments include a determination module and a selection module.

In one embodiment, the determination module determines a current surface that is likely facing a user. In one embodiment, the selection module selects one or more sensors associated with the current surface for user input.

A method is also presented. The method in the disclosed embodiments substantially includes the steps to carry out the functions presented above with respect to the operation of the described apparatus. The method includes, in one embodiment, determining, between at least two surfaces of an information handling device, a current surface that is likely facing a user. The information handling device may have at least two sensors and at least one of the sensors may be associated with one or more of the surfaces. In one embodiment, the method also includes selecting one or more sensors associated with the current surface for user input.

A computer program product is also presented. In one embodiment, the computer program product includes determining, between at least two surfaces of an information handling device, a current surface that is likely facing a user. The information handling device may have at least two sensors and at least one of the sensors may be associated with one or more of the surfaces. In one embodiment, the computer program product also includes selecting one or more sensors associated with the current surface for user input.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Figure 1:
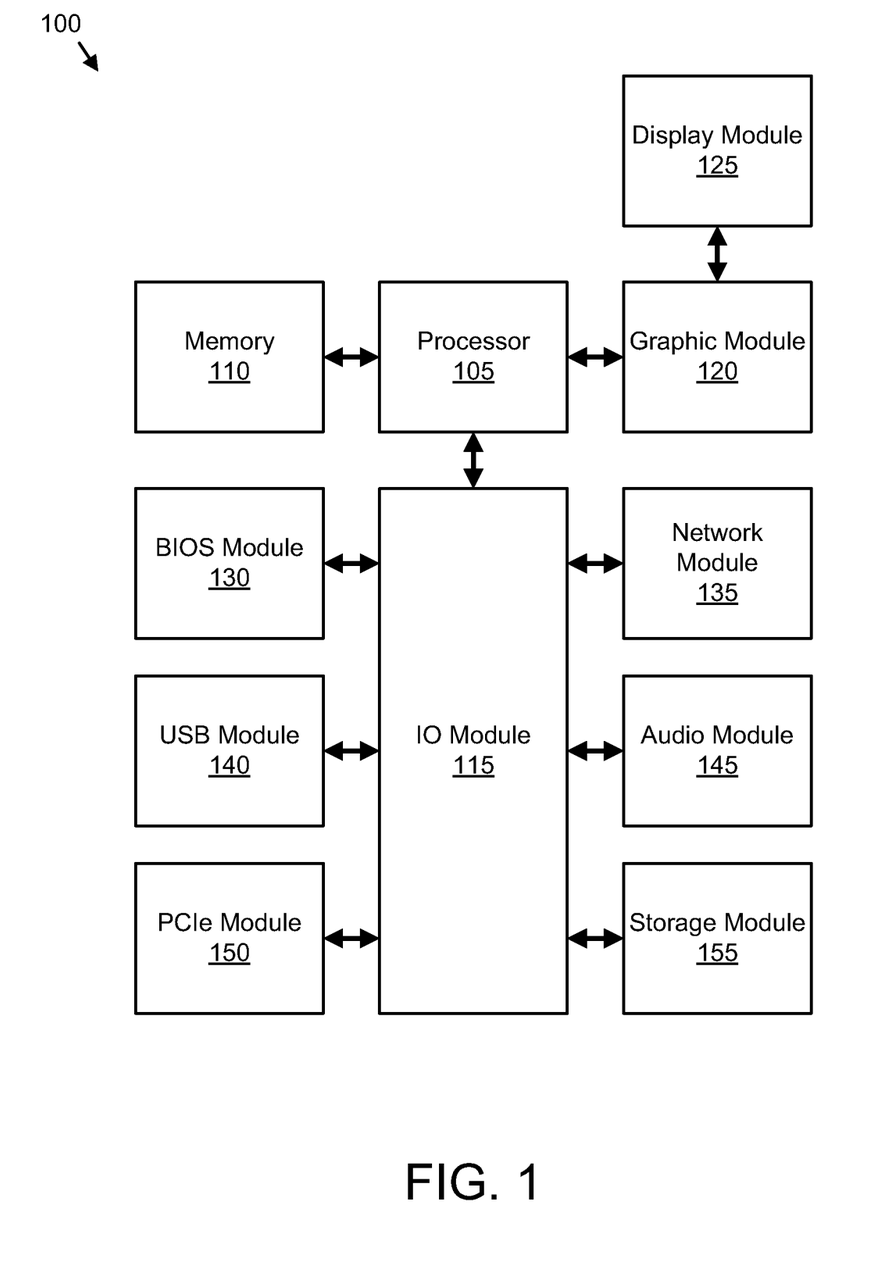
FIG. 1 is a schematic block diagram illustrating one embodiment of a computer system in accordance with the present subject matter.

FIG. 1 is a schematic block diagram illustrating one embodiment of a computer system 100. The computer system 100 includes a processor 105, a memory 110, an IO module 115, a graphics module 120, a display module 125, a basic input/output system ("BIOS") module 130, a network module 135, a universal serial bus ("USB") module 140, an audio module 145, a peripheral component interconnect express ("PCIe") module 150, and a storage module 155. One of skill in the art will recognize that other configurations of a computer system 100 or multiple computer systems 100 may be employed with the embodiments described herein.

The processor 105, memory 110, IO module 115, graphics module 120, display module 125, BIOS module 130, network module 135, USB module 140, audio module 145, PCIe module 150, and storage module 155, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 155. The storage module 155 may comprise at least one Solid State Device ("SSD"). In addition, the storage module 155 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110 and the graphic module 120.

In addition, the processor 105 may communicate with the IO module 115. The IO module 125 may support and communicate with the BIOS module 130, the network module 135, the PCIe module 150, and the storage module 155.

The PCIe module 150 may communicate with the IO module 115 for transferring data or power to peripheral devices. The PCIe module 150 may include a PCIe bus for attaching the peripheral devices. The PCIe bus can logically connect several peripheral devices over the same set of connections. The peripherals may be selected from a printer, a joystick, a scanner, or the like. The PCI module 150 may also comprise an expansion card as is well known to those skilled in the art.

The BIOS module 130 may communicate instructions through the IO module 115 to boot the computer system 100, so that computer readable software instructions stored on the storage module 155 can load, execute, and assume control of the computer system 100. Alternatively, the BIOS module 130 may comprise a coded program embedded on a chipset that recognizes and controls various devices that make up the computer system 100.

The network module 135 may communicate with the IO module 115 to allow the computer system 100 to communicate with other devices over a network. The devices may include routers, bridges, computers, printers, and the like. The display module 125 may communicate with the graphic module 120 to display information. The display module 125 may be a cathode ray tube ("CRT"), a liquid crystal display ("LCD") monitor, or the like. The USB module 140 may communicate with one or more USB compatible devices over a USB bus. The audio module 145 may generate an audio output.

Figure 2:
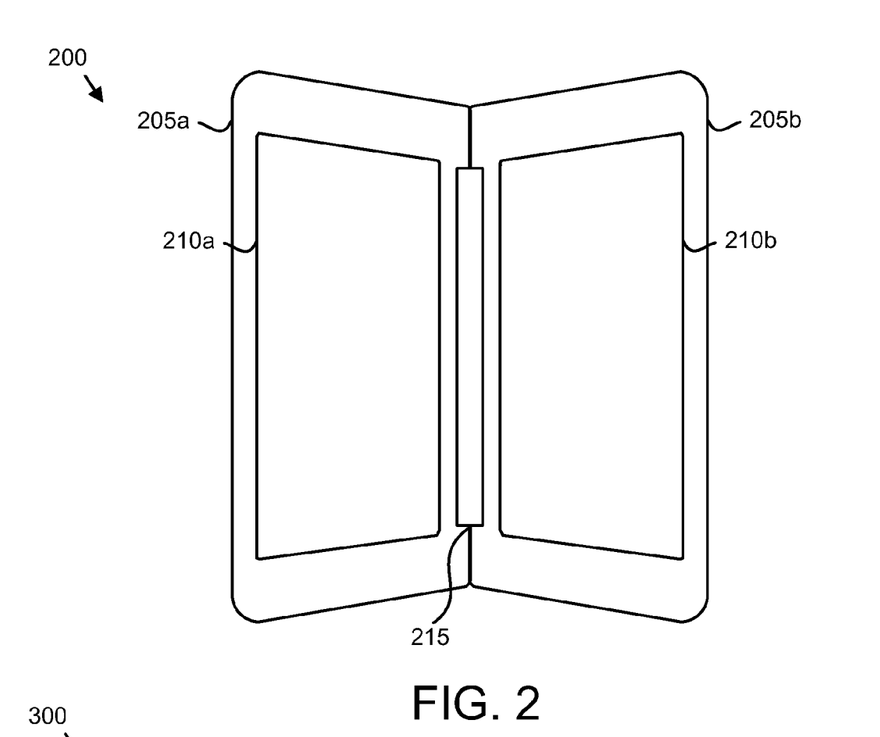
FIG. 2 is a schematic block diagram illustrating one embodiment of an information handling device with a plurality of sensors and a plurality of surfaces.

FIG. 2 illustrates one embodiment of an information handling device 200 with a plurality of sensors 210a, 210b and a plurality of surfaces 205a, 205b. The information handling device 200 includes a first surface 205a with a first sensor 210a and a second surface 205b with a second sensor 210*b*. The information handling device 200 may be one embodiment of the computer system 100 depicted in FIG. 1. The information handling device 200 may be a portable or handheld electronic and/or computing device such as a personal desktop assistant ("PDA"), a tablet computer, a slate or pad computer, an e-Book reader, a mobile phone, a Smartphone, and/or the like. The first sensor 210*a* and/or the second sensor 210*b* may receive user input by way of user touch and/or user movement. In one embodiment, the first sensor 210*a* and/or the second sensor 210*b* comprises a capacitive touchscreen. In certain embodiments, the first sensor 210*a* and/or the second sensor 210*b* comprises a touchpad or other suitable sensor. Although two sensors 210*a*, 210*b* and two surfaces 205*a*, 205*b* are depicted, in other embodiments, the information handling device 200 may include more than two sensors 210*a*, 210*b* and more than two surfaces 205*a*, 205*b*.

The information handling device 200 may be embodied in a "clamshell" configuration. Specifically, the information handling device 210 may include a hinge 215, allowing the first surface 205*a* to rotate in relation to the second surface 205*b* and/or the second surface 205*b* to rotate in relation to the first surface 205*a*. For example, the information handling device 200 may close with the first sensor 210*a* facing the second sensor 210*b*, open so that the first sensor 210*a* substantially faces a same direction as the second sensor 210*b* or so the first sensor 210*a* substantially faces a direction opposite a direction that the second sensor 210*b* faces.

In certain embodiments, the first sensor 210*a* may reside on the information handling device 200 on a surface opposite the second sensor 210*b*. For example, the information handling device 200 may include the first sensor 210*a* on its front and include the second sensor 210*b* on its back.

Figure 3:
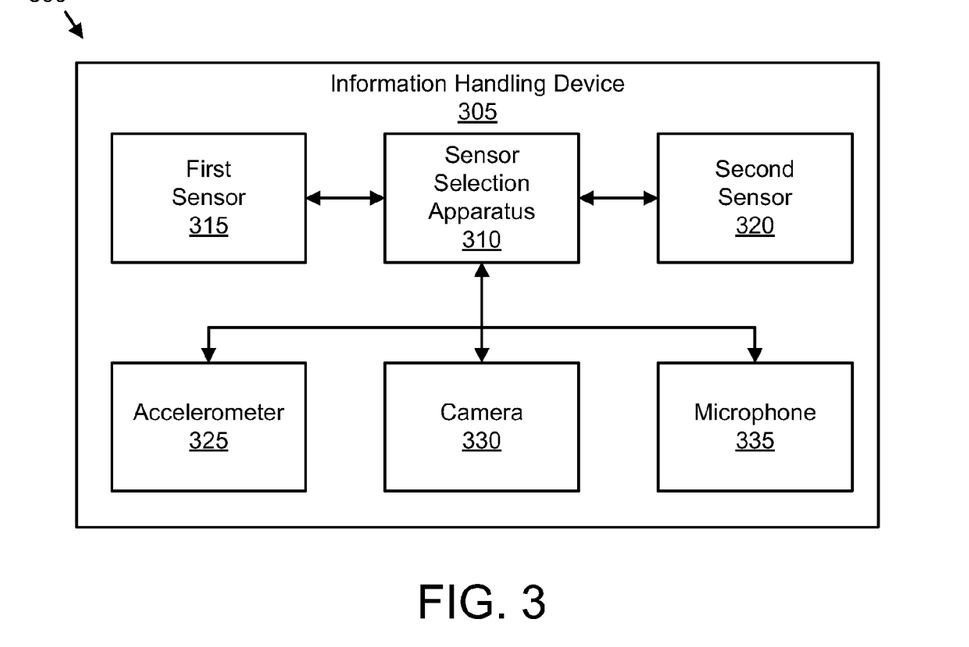
FIG. 3 is a schematic block diagram illustrating one embodiment of a system for selecting a sensor for user input in accordance with the present subject matter.

FIG. 3 depicts one embodiment of a system 300 for selecting a sensor for user input. The system 300 includes an information handling device 305 with a sensor selection apparatus 310, a first sensor 315, a second sensor 320, and an accelerometer 325, a camera 330, and a microphone 335. The information handling device 305 may be one embodiment of the computer system 100 depicted in FIG. 1 and/or the information handling device 200 depicted in FIG. 2. The information handling device 305 may include memory, a storage device storing computer readable programs, and/or a processor that executes the computer readable programs as is known to those skilled in the art. The information handling device 305 may be embodied as a portable or handheld electronic device and/or portable or handheld computing device such as a PDA, a tablet computer, a slate or pad computer, an e-Book reader, a mobile phone, a Smartphone, and/or the like.

The first and second sensors 315, 320 may be similar to the first and second sensors 210*a*, 210*b* in FIG. 2, comprising capacitive touchscreens, touchpads, and the like. The information handling device 305 may include at least two surfaces. In one embodiment, the first sensor 315 is on a first surface of the information handling device 305 and the second sensor 320 is on a second surface of the information handling device 305 different than the first surface. In a further embodiment, the first surface faces a first direction substantially opposite a second direction faced by the second surface. In certain embodiments, the first surface may be rotatable, as described above in relation to FIG. 2, in relation to the second surface such that the first sensor 315 and the second sensor 320 may face various directions.

The first and second sensors 315, 320 may be input components for the information handling device 305. Other input components may include the accelerometer 325, the camera 330, and the microphone 335. The accelerometer 325 measures physical acceleration (magnitude and direction), position, and/or shock of the information handling device 305. The accelerometer 325 may output an acceleration signature including acceleration measurements, accelerometer values at a point in time and/or over a time period, changes in accelerometer values, and the like. The camera 330 may comprise a digital camera. The camera 330 may capture images and output digital image data as is known in the art. The microphone 335 may receive sound and output audio data as is known in the art.

A user may interact with a particular sensor (e.g. the first sensor 315) and inadvertently enter extraneous input into the other sensor (e.g. the second sensor 320). For example, a user may, when interacting with the first sensor 315, rest a hand on the second sensor 320, providing unwanted interactions.

Therefore, the first information handling device 305 includes a sensor selection apparatus 310 to determine a particular surface likely facing a user. The sensor selection apparatus 310 may select one or more sensors associated with the particular surface for user input, may activate user input on the one or more sensors, and/or deactivate user input on other sensors (e.g. sensors on surfaces other than the particular surface) to minimize extraneous input. Furthermore, the sensor selection apparatus 310 may also reference output from one or more input components such as the accelerometer 325, the sensors 315, 320, the camera 330, and the microphone 335, to determine the particular surface likely facing the user. Consequently, in one embodiment, the sensor selection apparatus 310 communicates with and/or receives output from the accelerometer 325, the sensors 315, 320, the camera 330, and the microphone 335.

The sensor selection apparatus 310 may reside in or be in communication with the information handling device 305. All or a portion of the sensor selection apparatus 310 may be stored on memory and executed by a processor (e.g. of the information handling device 305) and/or may be implemented as logic hardware. Furthermore, the sensor selection apparatus 310 may, in one embodiment, comprise driver level and/or firmware level code in the information handling device 305. In one embodiment, sensor selection apparatus 310 may be integrated with and/or in communication with software, drivers, hardware, and/or firmware of the information handling device 305.

Figure 4:
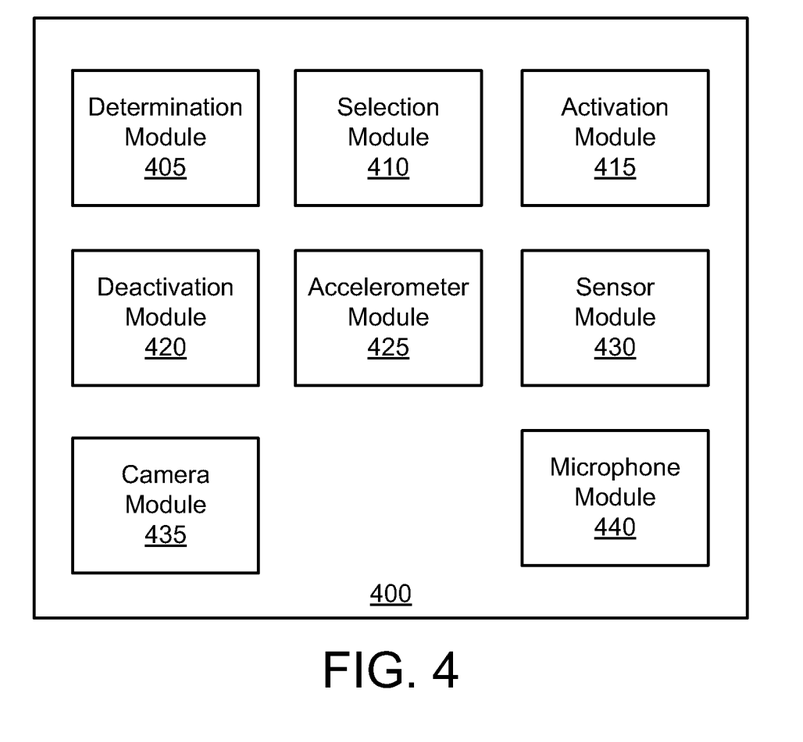
FIG. 4 is a schematic block diagram illustrating one embodiment of an apparatus for selecting a sensor for user input in accordance with the present subject matter.

FIG. 4 illustrates one embodiment of an apparatus 400 for selecting a sensor for user input. The apparatus 400 may comprise one embodiment of the sensor selection apparatus 310 depicted in FIG. 3. The description of the apparatus 400 refers to elements of FIGS. 1 and 3, like numbers referring to like elements. The apparatus 400 includes one or more of a determination module 405, a selection module 410, an activation module 415, a deactivation module 420, an accelerometer module 425, a sensor module 430, a camera module 435, and a microphone module 440.

The determination module 405, in one embodiment, determines a surface (a "current" surface) that is likely facing a user. In one embodiment, the determination module 405 determines the current surface from at least two surfaces of an information handling device 305. The information handling device 305 may include at least two sensors and at least one of the sensors may be associated with one or more of the surfaces. In one embodiment, the determination module 405 determines the current surface based on output from one or more information handling device input components 325, 330, 335.

In one embodiment, the determination module 405 determines the current surface based on accelerometer output from an accelerometer input component 325 of the information handling device 305. Specifically, the accelerometer output may include positional data indicating that the information handling device 305 is being held by a user with a certain surface (and any sensors associated with the certain surface) facing up in relation to the user, facing forward in relation to the user, facing away from the ground, and the like. Likewise the accelerometer output may indicate that a particular surface is facing the ground, indicating that a surface on an opposite side of the information handling device 305 is likely facing the user.

In certain situations, a surface facing the ground may in fact, be facing the user (e.g. the user is laying down while interacting with the information handling device 305). The determination module 405 may therefore reference output from other input components instead of or in addition to accelerometer output. In one embodiment, the determination module 405 determines the current surface based on an amount of area touched on sensors of the information handling device 305. The determination module 405 may determine the current surface based on an amount of area touched on the first sensor 315 and the second sensor 320. Specifically, the determination module 405 may determine that output from the first sensor 315 specifying that the first sensor 315 has a larger area touched than a second sensor 320 indicates that a surface associated with the second sensor 320 is more likely than a surface associated with the first sensor 315 to face the user. For example, if the information handling device 305 has the first sensor 315 on one surface and the second sensor 320 on an opposite surface and the user rests the information handling device 305 in her hand with the first sensor 315 (and first surface) against her palm, the first sensor 315 would have a greater area touched.

In one embodiment, the determination module 405 determines the current surface based on camera output from a camera input component 330 of the information handling device 305. Specifically, the camera output may include digital image data with a portion of the user's eye or face indicating that a surface associated with the camera input component 330 is likely facing the user. In one embodiment, the determination module 405 may reference the camera output and analyze the camera output using a facial recognition/detection application and/or an eye recognition/detection application as is known in the art, to detect the presence of an image of an eye or a face in the camera output.

In one embodiment, the determination module 405 determines the current surface based on microphone output from a microphone input component 335. In one embodiment, the determination module 405 may reference the microphone output and analyze audio data of the microphone output. Microphone output in which a volume of a voice is above a certain level may indicate that a microphone input component 335 is on a surface facing a user. A sensor 320 on that same surface may be more likely to be facing the user than any sensors on other surfaces.

In a further embodiment, the determination module 405 determines that a particular surface is the current surface in response to determining that a majority of input components 325, 330, 335 indicate that the particular surface is likely facing the user. For example, if accelerometer output and camera output indicate that a second surface is likely facing the user, but microphone output indicates that a first surface is likely facing the user, the determination module 405 may determine that the second surface is likely facing the user. In certain embodiments, the determination module 405 analyzes output from input components 325, 330, 335 in a predetermined order and may discontinue evaluating output when a majority of input components 325, 330, 335 indicate that a certain surface is likely facing the user.

In one embodiment, the determination module 405 associates a predetermined weight with each of the input components 325, 330, 335 and the determination module 405 determines the current surface based on the output from the one or more input components 325, 330, 335 according to the predetermined weight of the one or more input components 325, 330, 335. For example, accelerometer output may be granted a weight twice that of camera output, microphone output, and output from the sensors 315, 320. In this example, in order for an indication of the accelerometer output to be disregarded, each of the other input components' 330, 335 output would indicate a surface as likely to be facing the user different from that indicated by the accelerometer output.

The selection module 410, in one embodiment, selects one or more sensors associated with the current surface (e.g. the surface determined by the determination module 405 as likely facing the user) for user input. Selecting one or more sensors associated with the current surface for user input may include causing the one or more sensors associated with the current surface to be activated and capable of receiving/continuing to receive user input, causing any other sensors (e.g. on other surfaces besides the current surface) to be deactivated for user input, and the like. In one embodiment, a sensor is associated with a particular surface by being located on the particular surface, residing on the particular surface, comprising the particular surface, integrated with the particular surface, and the like.

The activation module 415, in one embodiment, activates user input on one or more sensors 315 associated with the current surface. In one embodiment, the activation module 415 activates user input on a particular sensor 315 that is not currently active for user input. In one embodiment, the particular sensor 315 is currently active and the activation module 415 maintains user input functions on the particular sensor 315.

The deactivation module 420, in one embodiment, deactivates user input on one or more sensors 320 associated with one or more other surfaces (e.g. not determined by the determination module 405 to be the current surface). Deactivating user input on a particular sensor 320 may include disabling user input on the particular sensor 320, alerting the information handling device 305 to ignore any user input on the particular sensor 320, and/or the like.

The accelerometer module 425, in one embodiment, references accelerometer output from the accelerometer input component 325 of the information handling device 305. The accelerometer module 425 may be in communication and/or receive or reference output from the accelerometer input component 325 and may send or otherwise make available the output to the determination module 405. The determination module 405 may determine the current surface based on the accelerometer input as described above.

The sensor module 430, in one embodiment, may receive and/or reference output from the sensors 315, 320 and determine an amount of area touched on each sensor 315, 320. The sensor module 430 may determine an amount of area touched on the first sensor 315 and the second sensor 320 and communicate or otherwise make available this information to the determination module 405. The determination module 405 may determine the current surface based on the amount of area touched on the first sensor 315 and the second sensor 320. For example, if the first sensor 315 has a greater amount of area touched in relation to the second sensor 320 and the first sensor 315 and the second sensor 320 are on different surfaces of the information handling device 305, the determination module 405 may determine that a surface associated with the second sensor 320 is likely to be facing the user.

The camera module 435, in one embodiment, references camera output from a camera input component 330 of the information handling device 305. The camera module 435 may be in communication and/or receive or reference output from the camera input component 330 and may send or otherwise make available the output to the determination module 405. The determination module 405 may determine the current surface based on the camera output as described above.

The microphone module 440, in one embodiment, references microphone output from a microphone input component 335 of the information handling device 305. The microphone module 440 may be in communication and/or receive or reference output from the microphone input component 335 and may send or otherwise make available the output to the determination module 405. The determination module 405 may determine the current surface based on the microphone output as described above.

Figure 5:
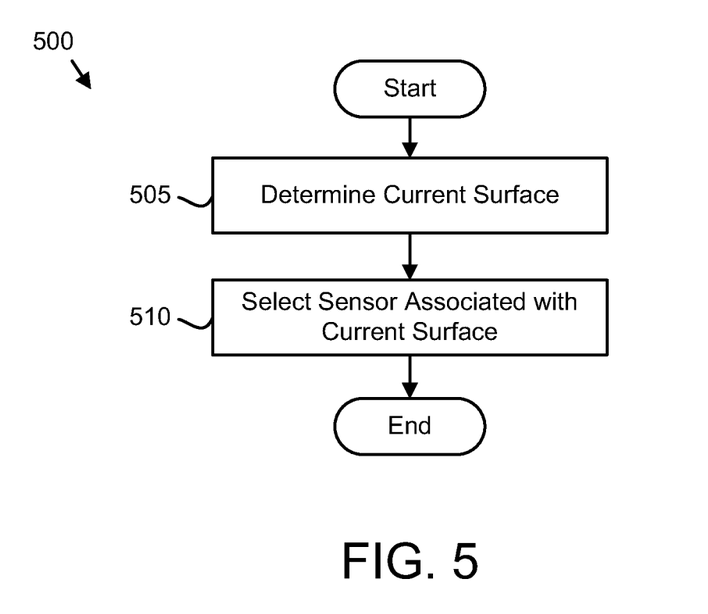
FIG. 5 is a schematic flow chart diagram illustrating one embodiment of a method for selecting a sensor for user input in accordance with the present subject matter.

FIG. 5 illustrates one embodiment of a method 500 for selecting a sensor for user input. The method 500 may implement at least a portion of the functions of the apparatus 400 of FIG. 4. The description of the method 400 refers to elements of FIGS. 1, 3, and 4, like numbers referring to like elements.

The method 500 begins and the determination module 405 determines 505, between at least two surfaces of an information handling device 305 having at least two sensors 315, 320, a current surface that is likely facing a user. At least one of the sensors 315, 320 is associated with one or more of the surfaces. Next, the selection module 410 selects 510 one or more sensors associated with the current surface for user input. Then, the method 500 ends.

Figure 6:
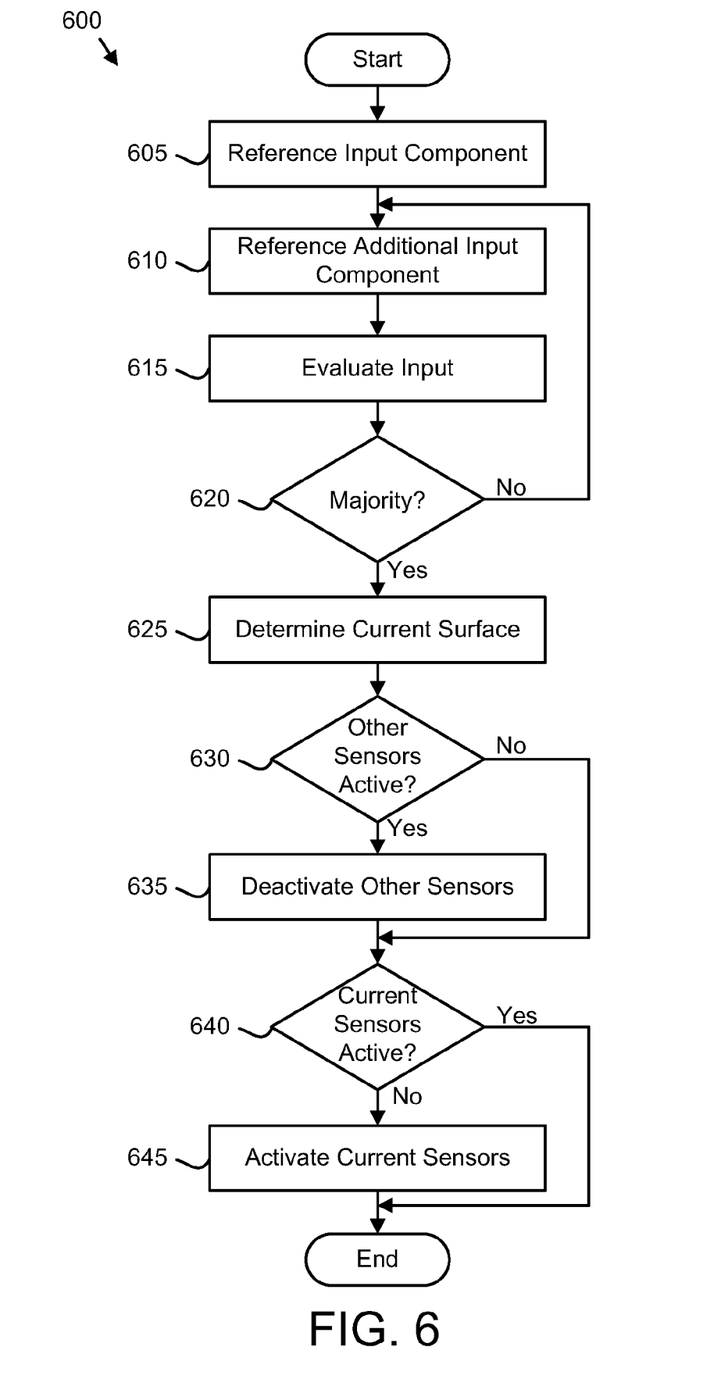
FIG. 6 is a detailed schematic flow chart diagram illustrating another embodiment of a method for selecting a sensor for user input in accordance with the present subject matter.

FIG. 6 illustrates another embodiment of a method 600 for selecting a sensor for user input. The method 600 may implement at least a portion of functions of the apparatus 400 of FIG. 4. The description of the method 600 refers to elements of FIGS. 1, 3, and 4, like numbers referring to like elements.

The method 600 begins and one of the input component modules (e.g. the accelerometer module 425, the sensor module 430, the camera module 435, or the microphone module 440) references 605 its respective input component of an information handling device 305 with at least two surfaces and a first sensor 315 associated with a first surface and a second sensor 320 associated with a second surface. Next, another input component module besides the input component module from step 605, references 610 an additional input component. The determination module 405 evaluates 615 the input from the input components 325, 330, 335. If the determination module 405 determines 620 that there is no majority of input components 325, 330, 335 indicating either the first surface or the second surface is likely facing a user, the method 600 continues with step 610 and another input component module besides the previous input component modules references 610 an additional input component and the method 600 continues with step 615.

Alternatively, if the determination module 405 determines 620 that there is a majority of input components 325, 330, 335 indicating that either the first surface or the second surface is likely facing a user, the determination module 405 determines 625 that the surface indicated by the majority of input components is the current surface. Assuming the first surface is the current surface, the deactivation module 420 determines 630 whether the second sensor 320 is currently active. If the second sensor 320 is active, the deactivation module 420 deactivates 635 the second sensor 320. Next, if activation module 415 determines 640 that the first sensor 315 (e.g. associated with the current surface) is active, the method 600 ends. Otherwise, the activation module 415 activates 645 the first sensor 315 the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an information handling device having at least two surfaces and at least two sensors, at least one of the sensors being associated with one or more of the surfaces, the at least two sensors selected from the group consisting of an accelerometer, a camera, and a microphone;
a sensor module determining an amount of area touched on a first sensor associated with a first surface and a second sensor associated with a second surface;
a determination module determining a current surface that is likely facing a user based at least in part on:
input received from the accelerometer, the accelerometer input indicating that a surface of the information handling device is directed toward the ground; and
responsive to the accelerometer input, input data that indicates whether the surface directed towards the ground is the current surface that is likely facing the user, the input data comprising one or more of:
one or more images captured by the camera, wherein it is determined that the surface directed towards the ground is the current surface likely facing the user in response to recognizing the user's face in an image of the one or more images; and
voice audio captured by the microphone, wherein it is determined that the surface directed towards the ground is the current surface likely facing the user in response to determining a volume of the voice audio exceeds a predetermined volume;
a selection module selecting one or more sensors associated with the current surface for user input.

2. The apparatus of claim 1, wherein the information handling device further comprises an accelerometer input component, the determination module further comprising an accelerometer module referencing accelerometer output from the accelerometer input component, the determination module determining the current surface based at least in part on the accelerometer output.

3. The apparatus of claim 1, wherein the information handling device further comprises a camera input component, the determination module further comprising a camera module referencing camera output from the camera input component, the determination module determining the current surface based at least in part on the camera output.

4. The apparatus of claim 1, wherein the information handling device further comprises a microphone input component, the determination module further comprising a microphone module referencing microphone output from the microphone input component, the determination module determining the current surface based at least in part on the microphone output.

5. The apparatus of claim 1, wherein one or more sensors comprises a capacitive touchscreen.

6. The apparatus of claim 1, wherein a first sensor is on a first surface of the information handling device and a second sensor is on a second surface of the information handling device different than the first surface.

7. The apparatus of claim 1, further comprising an activation module activating user input on one or more sensors associated with the current surface and a deactivation module deactivating user input on one or more sensors associated with one or more other surfaces.

8. The apparatus of claim 1, wherein the determination module further associates a predetermined weight with each of the input components, wherein determining the current surface based on the input of the one or more input components further comprises determining the current surface based at least in part on the output from the one or more input components according to the predetermined weight of the one or more input components.

9. The apparatus of claim 1, wherein the determination module determining the current surface further comprises the determination module determining the current surface based at least in part on output from one or more information handling device input components.

10. The apparatus of claim 9, wherein the determination module determines that a particular surface is the current surface in response to determining that a majority of input components indicate that the particular surface is likely facing the user.

11. A method comprising:
    determining a current surface that is likely facing a user based at least in part on:
        input received from the accelerometer, the accelerometer input indicating that a surface of the information handling device is directed toward the ground; and
        responsive to the accelerometer input, input data that indicates whether the surface directed towards the ground is the current surface that is likely facing the user, the input data comprising one or more of:
            one or more images captured by the camera, wherein it is determined that the surface directed towards the ground is the current surface likely facing the user in response to recognizing the user's face in an image of the one or more images; and
            voice audio captured by the microphone, wherein it is determined that the surface directed towards the ground is the current surface likely facing the user in response to determining a volume of the voice audio exceeds a predetermined volume; and
    selecting one or more sensors associated with the current surface for user input.

12. The method of claim 11, further comprising referencing accelerometer output of an accelerometer input component of the information handling device and determining the current surface based at least in part on the accelerometer output.

13. The method of claim 11, further comprising determining an amount of area touched on a first sensor and a second sensor and determining the current surface based at least in part on the amount of area touched on the first sensor and the second sensor.

14. The method of claim 11, further comprising referencing camera output of a camera input component of the information handling device and determining the current surface based at least in part on the camera output.

15. The method of claim 11, further comprising deactivating user input on one or more sensors associated with one or more other surfaces.

16. The method of claim 11, wherein a first sensor is located on a first surface of the information handling device and a second sensor is located on a second surface of the information handling device, the first and second surfaces being opposite one another.

17. The method of claim 11, wherein at least one of the sensors comprises a capacitive touchscreen.

18. The method of claim 11, wherein determining the current surface further comprises determining the current surface based at least in part on input of one or more information handling device input components.

19. The method of claim 18, further comprising associating a predetermined weight with each of the input components, wherein determining the current surface based on the input of the one or more input components further comprises determining the current surface based at least in part on the output from the one or more input components according to the predetermined weight of the one or more input components.

20. A computer program product comprising a non-transitory storage device storing machine readable code executed by a processor to perform the operations of:
    determining a current surface that is likely facing a user based at least in part on:
        input received from the accelerometer, the accelerometer input indicating that a surface of the information handling device is directed toward the ground; and,
        responsive to the accelerometer input, input data that indicates whether the surface directed towards the ground is the current surface that is likely facing the user, the input data comprising one or more of:
            one or more images captured by the camera, wherein it is determined that the surface directed towards the ground is the current surface likely facing the user in response to recognizing the user's face in an image of the one or more images; and
            voice audio captured by the microphone, wherein it is determined that the surface directed towards the ground is the current surface likely facing the user in response to determining a volume of the voice audio exceeds a predetermined volume; and
    selecting one or more sensors associated with the current surface for user input.

21. The computer program product of claim 20, further comprising referencing accelerometer output of an accelerometer input component of the information handling device and determining the current surface based at least in part on the accelerometer output.

22. The computer program product of claim 20, further comprising:
    determining an amount of area touched on a first sensor and a second sensor and determining the current surface based at least in part on the amount of area touched on the first sensor and the second sensor; and
    referencing camera output of a camera input component of the information handling device and determining the current surface based at least in part on the camera output.

* * * * *